United States Patent [19]
Whisler

[11] 3,858,695
[45] Jan. 7, 1975

[54] TRANSMISSION AND BRAKE INTERLOCK
[75] Inventor: Edwin Lee Whisler, Dubuque, Iowa
[73] Assignee: Deere & Company, Moline, Ill.
[22] Filed: Feb. 6, 1974
[21] Appl. No.: 439,886

[52] U.S. Cl. .............................. 192/4 A, 74/483 R
[51] Int. Cl. ............................................ B60k 29/02
[58] Field of Search .................. 192/4 A, 4 B, 4 C; 74/483 R

[56] References Cited
UNITED STATES PATENTS

| 823,522 | 6/1906 | Gramm | 74/483 |
| 2,411,455 | 11/1946 | Mullins et al. | 192/4 A |
| 2,998,809 | 9/1961 | Thomas | 74/483 X |
| 3,480,120 | 11/1969 | Lenzen et al. | 192/4 C |
| 3,566,711 | 3/1971 | Leuenberger | 74/483 |

Primary Examiner—Benjamin W. Wyche

[57] ABSTRACT

A transmission shift lever projects upwardly through a substantially U-shaped guide slot located in an instrument panel and is movable to respective positions in first and second legs of the slot for respectively establishing forward and reverse driving conditions in a transmission and is movable to the portion of the slot joining the legs for establishing a neutral condition in the transmission. A blocking plate is mounted on the instrument panel for movement crosswise to the legs of the slot between a normal first position wherein the plate is locates so as to not interfere with the movement of the shift lever in the U-shaped guide slot and a blocking position wherein the plate covers the legs of the slot and prevents the shift lever from being moved from its neutral position. A brake release rod projects upwardly through a keyhole-shaped slot located in the panel generally between and elongated crosswise to the legs of the U-shaped guide slot. A release rod is reciprocably mounted on the blocking plate and is movable between an extended normal released position in the small portion of the keyhole-shaped slot wherein the rod is adapted to hold a parking brake latching element in an inoperative position and holds the blocking plate in its normal position, and a retracted position in the large portion of the keyhole-shaped slot wherein the rod is adapted to dispose the latching element in a position for locking the parking brake in place, when the latter is actuated into engagement, and holds the blocking plate in its blocking position.

7 Claims, 2 Drawing Figures

PATENTED JAN 7 1975  3,858,695

TRANSMISSION AND BRAKE INTERLOCK

BACKGROUND OF THE INVENTION

The present invention relates to the control of a brake and transmission of a vehicle and more particularly relates to an interlocked brake and transmission control.

Vehicles such as industrial tractors and the like are commonly provided with parking brakes which for safety purposes are to be engaged when the vehicle is parked and left unattended. One problem which has arisen relating to the use of parking brakes is that the operator forget to release the parking brake before driving the vehicle. In such cases, the parking brake will often be damaged.

SUMMARY OF THE INVENTION

It is the primary object of the present invention to provide an interlocked vehicle brake and transmission control which overcomes the above-noted problems of the prior art.

Another object of the present invention is to provide a simple, compact control which can be operated with very little operator effort.

A more specific object of the present invention is to provide a shift lever movable in a guide slot among positions for establishing forward, reverse and neutral driving conditions in a vehicle transmission and to provide a blocking plate which moves in response to the movement of a parking brake release rod so as to be disposed for permitting free movement of the shift lever when the release rod is in a normal position adapted for holding a parking brake locking element in an inoperative position and for blocking movement of the shift lever from its neutral position when the release rod is in a retracted position adapted for permitting the parking brake latching element to lock the parking brake in an engaged position.

A further object relating to the object stated immediately above is to provide an interlocked control which prevents the parking brake from being engaged unless the shift lever is first moved to its neutral position.

These and other objects will be apparent by reading the ensuing description in conjunction with the appended drawings.

DETAILED DESCRIPTION OF THE PREFERRED EMBODIMENT

Preliminary to the description of the present invention, it is to be understood that the present invention is intended to be used in conjunction with known vehicle transmissions of a type selectively shiftable for establishing forward, reverse and neutral driving conditions therein and with known parking brake mechanisms of a type including a locking element shiftable through means of a release rod between an inoperative position wherein the locking element is disposed so as to be free from interference with the mechanism for actuating the parking brake and a locking position wherein the element is disposed so as to automatically engage and lock the mechanism once the mechanism has been actuated to engage the brake.

Figure 1:
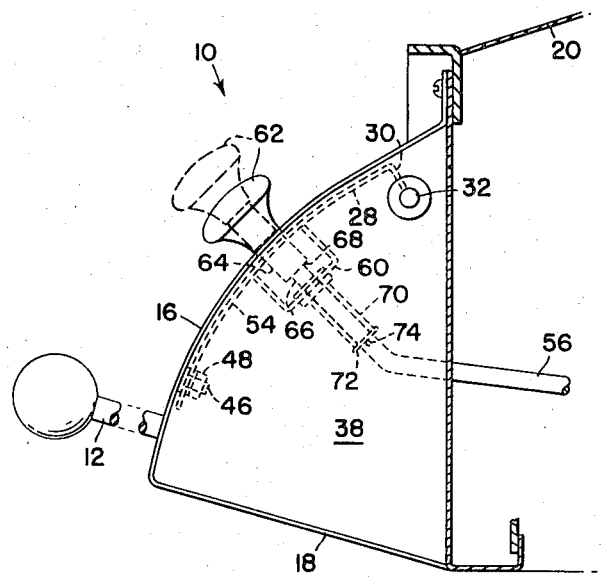
FIG. 1 is a vertical sectional view through that portion of a vehicle control console or instrument panel having the interlocked control of the present invention embodied therein.
Figure 2:
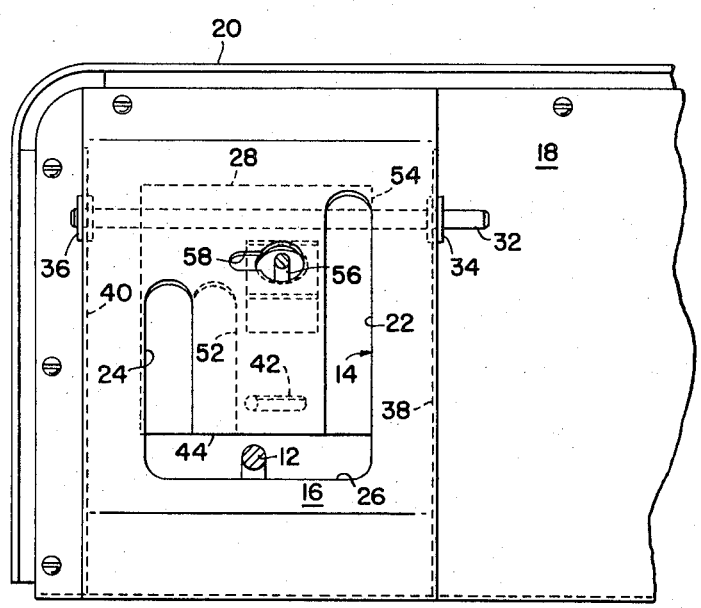
FIG. 2 is a front elevational view of the instrument panel and control shown in FIG. 1 with the shift lever and release rod being shown in section so as to reveal portions of the interlocked control.

Referring now to FIGS. 1 and 2 of the drawings, there is illustrated an interlocked control constructed according to the present invention and indicated in its entirety by the reference numeral 10. The interlocked control includes a conventional shift lever 12 which projects upwardly through a U-shaped slot 14 located in an upwardly and rearwardly facing arcuate plate portion 16 on a control or instrument panel 18 which is supported on a support shown partially at 20. The U-shaped slot 14 includes right and left fore-and-aft extending slot portions 22 and 24 which are interconnected by a connecting portion 26. When the lever 12 is in the connecting portion 26, as illustrated in FIG. 2, the lever is in a neutral position for establishing a neutral condition in a transmission (not shown). To establish a forward driving condition in the transmission, the lever 12 is moved to a series of locations spaced along the right slot portion 22 and for establishing reverse driving conditions in the transmission, the lever 12 is moved to a series of locations spaced along the left slot portion 24.

Positioned beneath and shaped complementary to the arcuate portion 16 of the panel 18 is a blocking plate 28 having a downturned upper end 30 to which is fixed a transversely extending rod 32. The rod is reciprocably received in right and left grommets 34 and 36, respectively, which are respectively fixed in right and left transversely spaced vertical panel side portions 38 and 40. The blocking plate 28 has a transversely extending slot 42 adjacent its lower edge 44 and fixed to the underside of the panel 18 and projecting into the slot 42 is a stud 46 on which is threaded a nut 48 which loosely holds a washer against a lower surface of the blocking plate. As can best be seen in FIG. 2, the blocking plate 28 is dimensioned so as to extend beneath the arcuate portion 16 of the panel 18 and mask the right and left slot portions 22 and 24 when the blocking plate is in a blocking position as shown. When in this position, the blocking plate prevents the shift lever 12 from being moved from its neutral position. An elongate notch 52 having a shape complementary to the left slot portion 24 of the U-shaped slot 14 is formed in the lower edge 44 of the blocking plate 28 and is disposed such that when the blocking plate 28 is moved leftwardly from the blocking position shown to a normal position, the notch registers with the slot portion 24. At the same time, a right edge 54 of the blocking plate is moved so as to be in register with the left edge of the right slot portion 22 of the U-shaped slot 14. When the blocking plate is in its normal position, the shift lever 12 is freely movable within the U-shaped slot 14. A parking brake release rod 56 projects upwardly through the blocking plate 28 and a keyhole-shaped slot 58 located in the panel 18 between the right and left slot portions 22 and 24 of the U-shaped slot 14. The release rod 56 is supported on the underside of the blocking plate 28 through means of a U-shaped bracket 60 having the tops of opposite leg portions fixed to the underside of the blocking plate 28, the release rod 56 being slidably supportably mounted in a hole in the lower portion of the bracket 60. A knob 62 forms the upper end of the release rod 56 and provides means by which the release rod is easily gripable by the hands of an operator. Located immediately below the knob 62 is an upper first section 64 of the release rod which is dimensioned such that it is too large to be moved sideways into the small end portion of the keyhole-shaped slot 58. The release rod 56 is illustrated in solid lines in a retracted brake engage position wherein it is adapted to position a parking brake locking element such that the element will automatically lock a parking brake actuating linkage in the engaged position once it is moved to the engaged position. When the release rod is in this position, the first section 64 is located in the large end of the keyhole-shaped slot 58. The release rod 56 is movable from the solid line position shown to a normal brake release position shown in dashed lines in FIG. 1, and when in this position the first section 64 of the rod is located at a level above the panel 18 and a lower adjacent second section 66 is disposed in the small end portion of the keyhole-shaped slot 58. When the release rod 56 is moved sideways into the small end of the slot 58, the blocking plate is moved from the blocking position shown to its normal position and a shoulder 68 at the bottom of the upper first section 64 of the release rod is in engagement with the control panel 18 and is held there through means of a coil compression spring 70 acting between the bottom of the bracket 60 and a washer 72 held in position on the release rod by a cotter pin 74.

The operation of the interlock control 10 is as follows. Assuming that the vehicle is parked and left unattended, the control 10 will normally be in the condition illustrated in solid lines wherein the shift lever 12 is in its neutral position and the blocking plate 20 is in its blocking position preventing the shift lever from being moved to cause driving engagement of the transmission. If it is desired to cause such driving engagement of the transmission, it is necessary only for the operator to apply pressure on the parking brake actuating mechanism and to grasp the knob 62 and pull upwardly on the release rod 56 a distance sufficient for the lower second section 66 of the rod to move directly across from the small end of the keyhole-shaped slot 58, the rod then being shifted leftwardly causing simultaneous leftward shifting movement of the blocking plate 28. The blocking plate 28 will then be disposed in its normal position with the notch 52 in register with the left slot portion 24 of the U-shaped slot 14 and with the right edge 54 in register with the left edge of the right slot portion 22. In this position of the rod 56, the spring 70 is compressed between the bracket 60 and the washer 72 and acts to maintain the shoulder 68 of the upper first section 64 of the release rod in tight engagement with the control panel 18. The latching element (not shown) of the parking brake mechanism will now be disposed such that it will not interfere with the parking brake linkage in the event that the latter is actuated to brake the vehicle.

Once the shift lever is moved into one or the other of the fore-and-aft extending slot portions 22 and 24 of the U-shaped slot 14, it is apparent that the brake release rod 56 cannot be returned to its solid line position shown in FIG. 2 unless the shift lever is first moved to its neutral position.

I claim:

1. An interlocked vehicle transmission and brake control, comprising: a support structure; an instrument panel fixed to the support structure to thus form part of a fixed console structure; an elongate opening being in said panel; a transmission shift lever projecting upwardly through said opening and the opening being shaped for guiding the transmission shift lever along a path between at least first and second locations of the opening for respectively establishing neutral and driving transmission conditions; a blocking plate shiftably mounted on said console structure for movement along a path disposed adjacent said panel between normal and blocking positions respectively wherein the plate is disposed clear of said path of movement of the shift lever so as to permit uninhibited movement of the shift lever in said elongate opening, and wherein the plate is disposed crosswise relative to said path of movement of the shift lever at a location which prevents movement of said shift lever between said first and second locations of the opening; a generally keyhole-shaped opening located in said panel adjacent said elongate opening and oriented substantially symmetrically relative to a line located along the path of shifting movement of the blocking plate; a brake release linkage including a manually operable rod projecting upwardly through said blocking plate and keyhole-shaped opening and being mounted on said blocking plate for shiftable movement therewith relative to said keyhole-shaped opening and for reciprocable movement relative thereto; said keyhole-shaped opening being defined by first and second interconnected portions, the first portion being larger in transverse dimension than the second portion; said rod being movable between a brake engage position corresponding to the blocking position of said blocking plate wherein a first section of the rod having a dimension too large to permit it to move into said second portion of the keyhole-shaped opening is received in said first portion of said keyhole-shaped opening and a normal brake release position corresponding to the normal position of the blocking plate and wherein said rod is disposed upwardly in said keyhole-shaped opening from said brake engage position to a brake release position wherein an immediately adjacent second section of said rod dimensioned to fit said second portion of said keyhole-shaped opening is received therein and said first section of the rod being engaged with the instrument panel at the periphery of said second portion of said keyhole-shaped opening, whereby said rod is shiftable into the second portion of said keyhole-shaped opening when the blocking plate is moved from its blocking to its normal position; and biasing means acting on said rod in a direction to maintain the rod in its brake engage position.

2. The transmission and brake control defined in claim 1 wherein said panel includes a portion which is arcuately curved rearwardly from its top to its bottom; and said blocking plate including a portion shaped complementary to said panel portion and positioned closely adjacent the underside thereof.

3. The transmission and brake control defined in claim 1 wherein said elongate opening is shaped such that said first location is spaced sideways from said second location; and said blocking plate having a rod integral with one side-to-side extending edge thereof and reciprocably supported in said support structure.

4. The transmission and brake control defined in claim 2 wherein said panel includes a pair of transversely spaced vertical sidewall portions integral with said arcuately curved portion, said elongate opening being shaped such that said first location is spaced transversely from said second location; and a transverse rod being fixed to said blocking plate and reciprocably mounted in said spaced vertical sidewall portions of said panel.

5. The transmission and brake control defined in claim 4 wherein said rod is fixed to an upper transverse edge of said blocking plate, said blocking plate having a lower transverse edge; a transversely elongated opening being located in said blocking plate adjacent said lower transverse edge; a threaded stud being fixed to said panel and projecting through said transversely elongated opening; and a nut being received on said stud so as to retain the blocking plate for sideways shifting movement as permitted by the transversely elongated opening.

6. The transmission and brake control defined in claim 2 wherein said guide slot is U-shaped; a first leg of said slot being for guiding the transmission shift lever to a series of positions for establishing forward driving transmission conditions; a second leg of said slot being for guiding the transmission lever to positions for establishing reverse driving transmission conditions, a transverse section of said slot interconnecting the legs of the slot and being for guiding the transmission lever to an intermediate location therealong for establishing a neutral transmission condition; and said blocking plate being shaped and located so as to mask the legs of the slot when the parking brake release rod is in its brake engage position and to permit free movement of the lever in the slot when the rod is in its brake release position.

7. The transmission and brake control defined in claim 6 wherein said blocking plate has a fore-and-aft elongated slot extending from a bottom transverse edge thereof which is shaped to register with the first leg of the guide slot only when the release rod is in its brake release position; and said blocking plate having a transverse dimension chosen such that a side edge of the plate registers with an inner side edge of the second leg of the guide slot only when the release rod is in its brake release position.

* * * * *